United States Patent [19]

Kawasaki et al.

[11] Patent Number: 4,800,184

[45] Date of Patent: Jan. 24, 1989

[54] METHOD FOR PRODUCING SULFUR PLATES

[75] Inventors: Masaki Kawasaki, Fukuoka; Kunio Mizukami, Yotsukaido, both of Japan

[73] Assignees: Kabushiki-Kaisha Yamau, Fukuoka; Onoda Cement Company Limited, Onoda, both of Japan

[21] Appl. No.: 81,932

[22] Filed: Aug. 4, 1987

[30] Foreign Application Priority Data

Aug. 6, 1986 [JP] Japan .................................. 61-185890

[51] Int. Cl.$^4$ ............................................ C04B 35/60
[52] U.S. Cl. ...................................... 501/140; 264/56; 264/87; 106/287.32
[58] Field of Search ............................ 106/85, 287.32; 501/140; 264/56, 87

[56] References Cited

U.S. PATENT DOCUMENTS

| | | | |
|---|---|---|---|
| 1,547,666 | 7/1925 | Pickard et al. | 501/140 |
| 4,025,352 | 5/1977 | Leutner et al. | 501/140 |
| 4,256,499 | 3/1981 | Terrel | 501/140 |
| 4,426,458 | 1/1984 | Woodhams | 106/287.32 |
| 4,496,659 | 1/1985 | Nimer et al. | 501/140 |

Primary Examiner—Steven Capella
Attorney, Agent, or Firm—Jordan and Hamburg

[57] ABSTRACT

A method for producing sulfur plates comprises producing an aqueous mixture by mixing and agitating sulfur powder, inorganic powder, fibers and water, filtering the aqueous mixture to form plates, molding the plates while dewatering, curing and drying the plates, and heating the plates at a temperature higher than the melting point of the sulfur. The sulfur plates attain a desired strength in a short time and are free from any cracks and have an excellent acid resistance.

6 Claims, 1 Drawing Sheet

METHOD FOR PRODUCING SULFUR PLATES

BACKGROUND OF THE INVENTION

The present invention relates to a method for producing sulfur plates.

Conventionally, owing to the low cost and its high mechanical strength, cement concrete has been popularly used in the field of civil engineering and construction engineering.

Cement concrete, however, exhibits a poor resistance to acid due to the presence of cement therein and cannot be used for locations or structures where acid is used, for example, the floors or walls of factories producing foods or handling aggressive chemicals.

Furthermore, in a country like Japan where earth or soil is considerably acidic, the installation of cement concrete products such as U-shaped gutters is extremely difficult since the concrete readily collapses under such stronk acidic environment.

Accordingly, for resolving the above defects of normal concrete, the sulfur concrete was developed.

Such sulfur concrete comprises sulfur, inorganic powder such as fly ash or silica powder, sands and gravels. For producing such sulfur concrete, two producing methods are known, wherein in one method, the raw materials are first heated at a temperature of higher than 120° C. and subsequently mixed and cast under heated condition. And in the other method, the raw materials are first mixed at an ambient temperature and subsequently put in a mold and heated and cast.

The sulfur concrete becomes hardened extremely faster than the conventional cement concrete and can acquire the desired strength in a shorter period than the conventional cement concrete. Accordingly, such sulfur concrete is especially convenient for the construction in the cold seasons or the cold districts which yet necessitates acid resistance.

However, in spite of the fact that the production of sulfur which is the major raw material for the sulfur concrete is considerably abundant in Japan, the cost per weight of the sulfur is twice to four times as high as the cost for the cement, and the civil engineering construction by sulfur concrete which requires a considerable amount of sulfur necessitates a tremendous construction cost and accordingly is not favorable in terms of economy.

Furthermore, since the sulfur concrete is neutral or slightly acidic, the conventional steel bars cannot be used for reinforcing the sulfur concrete and the constructions or structures built by using such sulfur concrete provided with said steel bars has given rise to problems in terms of the corrosion of the reinforcement.

Accordingly, it is an object of the present invention to provide a method for producing sulfur plates which can overcome the above defects of the conventional producing methods while minimizing an amount of sulfur as a raw material for producing such sulfur plates.

DISCLOSURE OF INVENTION

The present invention discloses a method for producing sulfur plates comprising producing an aqueous mixture by mixing and agitating sulfur powder, inorganic powder, fibers and water, filtering the aqueous mixture to form plates of a desired thickness, molding the plates in a desired shape while dewatering, curing and drying the plates, and heating the plates at a temperature higher than the melting point of the sulfur so as to melt the sulfur in the plates and to produce the sulfur plates.

In the above production process of the sulfur plates, the aqueous mixture is prepared by mixing and agitating sulfur powder, inorganic powder, fibers and water. The aqueous mixture is filtered to form a plate of a desired thickness and such filtered plate is molded into plates of a desired shape and thereafter pressed to squeeze water to form green products. The green products are cured and dried, and heated at a temperature higher than the melting point of the sulfur so as to melt the sulfur in the products, whereby the molten sulfur infiltrates into gaps formed along interwoven structure of fibers. Thus, the sulfur plates of this invention which has a desired thickness and desired strength are obtained.

In the above production process of the sulfur plates, the fibers work as reinforcing materials before and after the heating process and the inorganic powders work as a filler as well as a shrinkage restricting agent so that the sulfur plates as final products show high bending rupture strength, high impact resistance and high toughness, whereby the sulfur plates are virtually free from the occurrence of cracks while exhibiting an excellent acid resistance with a minimum amount of sulfur.

Accordingly, the sulfur plates can be effectively used for the construction of concrete structures which require resistance to acid. For example, for existing cement concrete structures or buildings, the sulfur plates can be adhered to the surface of such concrete structures in place, while for the construction of new cement concrete structures or buildings, the surface of the building per se can be formed by the sulfur plates partially or entirely so as to protect the surface from the acid.

Furthermore, for forming the sulfur plates in a specific shape for a specific application, for example, for the production of gutters, the plates which are filtered by a filtering machine are molded in a desired shape and such plates are squeezed and thereafter cured and dried and finally heated at a temperature above the melting point of sulfur. The gutters produced in the above manner, exhibit excellent acid-resistance as well as excellent mechanical strength.

Accordingly, the present invention has following advantages.

1 The sulfur plates produced by the method of the present invention attain a desired strength in a short time and are free from cracks and have an excellent acid-resistance and can be formed as thin plates.

2 By merely adhering such sulfur plates to the surface of the existing structures, the structures are effectively protected from the acid while maintaining the strength of the structures. Accordingly, compared to the structures completely made of sulfur concrete, the structures provided with the sulfur plates can drastically reduce the amount of sulfur as well as the construction cost necessary for the construction of the structures.

3 The sulfur plates can have any desired shape besides the flat rectangular plate. Namely the sulfur plates can vary in shape as well as thickness so that the sulfur plates have many applications including gutters.

4 The sulfur plates can be produced on a mass-production basis in any factories under excellent quality control to produce the high-quality sulfur plates in an inexpensive manner.

DETAILED DESCRIPTION OF A PREFERRED EMBODIMENT

Figure 1:
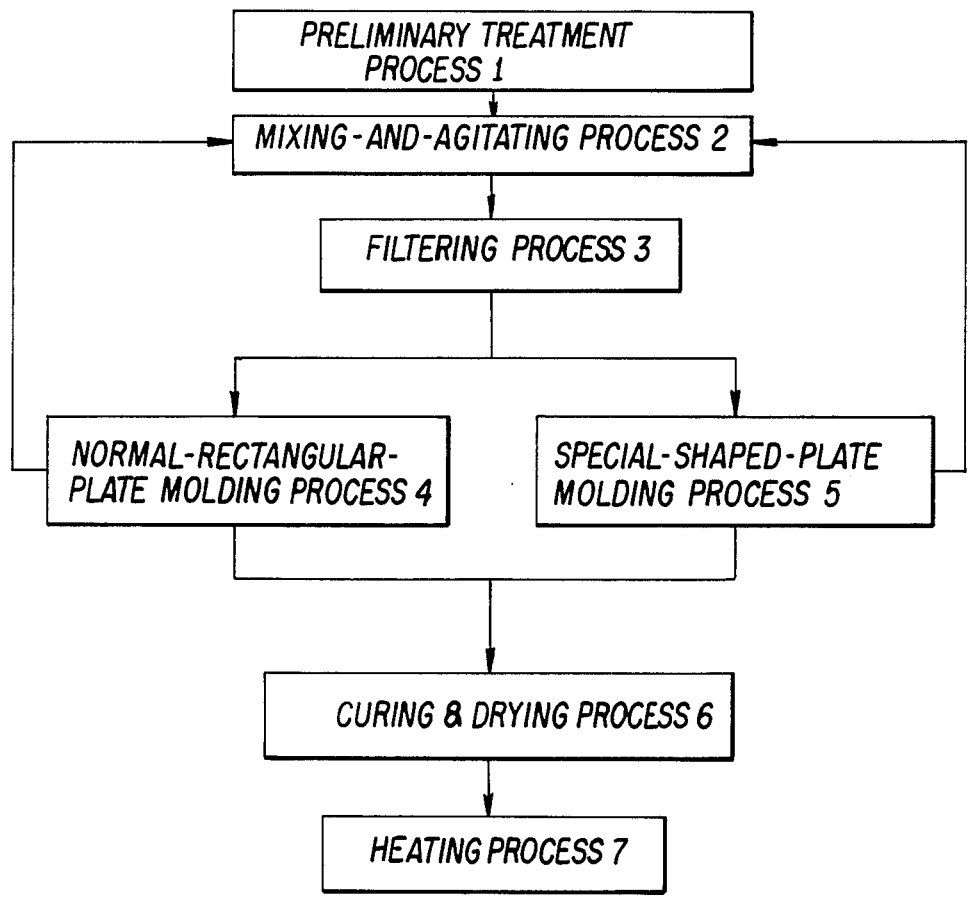
FIG. 1 is a flow chart of the method of the present invention for producing sulfur plates.

The method for producing sulfur plates is hereinafter disclosed in detail.

Raw materials for producing the sulfur plates comprise sulfur powder, inorganic powder, fibers and water.

Sulfur powder is the major component of the sulfur plate and works as a binder and gives excellent strength to the sulfur plates. The melting point and the boiling point of the sulfur are 119° C. and 446.6° C. respectively.

Inorganic powder may be a material selected from the group of fly ash, silica powder, iron-oxide powder and the like. The inorganic powder works as a filler, a shrinkage restricting agent and/or coloring agent.

Fibers may be a material selected from the group consisting of glass fibers, asbestos, carbon fibers or chemical polymer fibers having good resistance to acid. The fibers works as reinforcing materials before and after the heating process to give a favorable bending rupture strength, a favorable impact resistance and a favorable toughness.

When vegetable fibers such as pulp fibers are used in a small amount as a part of the above fibers, the vegetable fibers promote the dispersion of the aforementioned fibers which work as reinforcing material.

Water is used as a medium for mixing raw materials and for effecting the molding-by-filtering and is expelled or evaporated completely from the sulfur plates upon heating.

The above-mentioned raw materials are preferably mixed at a mixing ratio of 100 parts by weight of sulfur powder, 40 to 80 parts by weight or inorganic powder, 5 to 40 parts by weight of fibers which works as reinforcing materials, 0 to 5 parts by weight of vegetable fibers which work as dispersing materials and 700 to 1200 parts by weight of water.

The manner in which the sulfur plates are produced from the above raw materials is described hereinafter in conjunction with FIG. 1.

The entire process for producing the sulfur plates comprises a preliminary treatment process 1, a mixing-and-agitating process 2, a filtering process 3, a normal-rectangular-plate molding process 4, a special-shaped-plate molding process 5, a curing and drying process 6 and a heating process 7.

In the preliminary treatment process 1, the particle size of the sulfur powder is regulated by, for example, using a sieve. And the amount of each raw material is weighed.

In the mixing-and-agitating process 2, the raw materials are mixed and agitated in a suitable vessel to form an aqueous mixture. Such vessel is provided with an agitator.

In the filtering process 3, the aqueous mixture is charged into a drum-type vacuum filtering machine which is provided with a belt-type filter and is filtered to form a belt-like filtered product having a thickness of 1 mm on the belt.

As the above filtering operation is repeated several times, the thickness of the filtered product increases proportionally.

When the filtered product attains a predetermined or desired thickness by repeating above filtering operation, the filtered product is transferred to either the normal-rectangular-plate molding process 4 or the special-shaped-plate molding process 5.

In the normal-rectangular-plate molding process 4, the belt-like filtered product is cut at intervals to form plate-like filtered products having a width of 900 to 1000 mm, a length of 1800 to 2000 mm and a thickness of 5 to 8 mm.

Such plate-like filtered products (green products) are then subjected to a dewatering or water squeezing operation by a high pressure press and the water-squeezed green products are cured and dried in the curing and drying process 6 for a predetermined period.

In the special-shaped-plate molding process 5, belt-like filtered product which has a good flexibility is cut or press-molded in desired or special shapes and such special-shaped filtered products (green products) are then subjected to water squeezing operation by a high pressure press and the water-squeezed green products are cured and dried in the curing and drying process 6 for a predetermined period.

The scraps or waste which are produced in the above molding processes 4, 5 are charged in the vessel used in the mixing-and-agitating process 2 for the purpose of recycling.

The green products molded in the above molding processes 4, 5 and cured and dried in the curing and drying process 6 are heated in the heating process 7 to produce the sulfur plates.

Namely, in the heating process 7, the green products are transferred into a heating treatment room and the room temperature is gradually raised at least to a melting point of the sulfur (119° C.) and preferably to 140° to 150° C. The final room temperature is held for a predetermined period and subsequently lowered gradually to the ambient temperature.

Usually, the period for heating is about 40 to 50 minutes.

In the heating process 7, the molten sulfur infiltrates into gaps formed among interwoven structure of fibers.

Furthermore, in the heating process, a press may be utilized for applying a pressure on the green products while heating, thus expelling air included in the green products to make the final products denser.

The sulfur plates which are produced in the above manner can be used as wall components or floor components like cement concrete palens or can be adhered to the surfaces of the existing cement concrete structures to improve the acid resistance of the structures.

This invention is also applicable to the production of U-shaped gutters which are installed on the soil or ground rich in acid.

We claim:
1. A method for producing sulfur plates comprising:
   (a) producing an aqueous mixture by mixing and agitating sulfur powder, inorganic powder, fibers and water,
   (b) charging the aqueous mixture into a vacuum filtering machine which is provided with a belt-type filter and in the vacuum filtering machine continuously filtering the aqueous mixture and continuously forming the aqueous mixture into plates,
   (c) molding the plates while dewatering,
   (d) curing and drying the plates, and
   (e) heating the plates at a temperature higher than the melting point of the sulfur.

2. A method for producing sulfur plates according to claim 1, wherein the inorganic powder is fly ash, silica powder or iron-oxide powder.

3. A method for producing sulfur plates according to claim 1, wherein the heating temperature is 140° to 150° C.

4. A method for producing sulfur plates according to claim 1, wherein the fibers consist of first fibers which act as reinforcing materials and second fibers which promote the dispersion of the said first fibers, said first fibers being glass fibers, asbestos, carbon fibers or chemical polymer fibers and said second fibers being vegetable fibers.

5. A method for producing sulfur plates according to claim 4, wherein the mixing ratio of the aqueous mixture is 100 parts by weight of sulfur powder, 40 to 80 parts by weight of inorganic powder, 5 to 40 parts by weight of said first fibers which act as reinforcing materials, up to 5 parts by weight of said second fibers which promote the dispersion of said first fibers and 700 and 1200 parts by weight of water.

6. A method for producing sulfur plates according to claim 4, wherein the vegetable fibers are pulp fibers.

* * * * *